United States Patent [19]
Nilsson

[11] 3,758,044
[45] Sept. 11, 1973

[54] LOCKING DEVICE FOR VEHICLE SAFETY BELTS

[75] Inventor: Karl-Ivar Sigurd Nilsson, Upplands Vasby, Sweden

[73] Assignee: Granges-Essem AB, Vasteras, Sweden

[22] Filed: June 10, 1971

[21] Appl. No.: 151,882

[30] Foreign Application Priority Data
June 10, 1970  Sweden.............................. 8064/70

[52] U.S. Cl...... 242/107.4, 200/61.48, 280/150 SB, 297/388
[51] Int. Cl............................................ A62b 35/00
[58] Field of Search .............................. 280/150 SB; 242/107.4; 180/82 C; 297/388; 200/61.48

[56] References Cited
UNITED STATES PATENTS

| | | | |
|---|---|---|---|
| 2,833,878 | 5/1958 | Dawson | 200/61.5 |
| 3,323,749 | 6/1967 | Karlsson | 242/107.4 |
| 3,495,786 | 2/1970 | Hemens | 242/107.4 |
| 3,588,401 | 6/1971 | Berryman | 200/61.48 |

Primary Examiner—Leo Friaglia
Attorney—Fred C. Philpitt

[57] ABSTRACT

A locking device for retractable vehicle safety belts for preventing extraction of the belt only at a change of direction or velocity of the vehicle above a predetermined level, including a tiltable member having a first position releasing the belt and a second position locking the belt, said tiltable member being in the locking position only when actuated by a force above a certain limit.

4 Claims, 8 Drawing Figures

LOCKING DEVICE FOR VEHICLE SAFETY BELTS

The present invention relates to locking devices for vehicle safety belts of the kind wherein a safety belt band is automatically retracted into a cover and wound onto a winding spindle, when the safety belt is not in use, for preventing extraction of the band at rapid changes of direction or velocity of the vehicle.

Modern safety belts for vehicles, particularly motor-cars, are provided with a spring operated winding spindle, which is arranged in a cover, into which a band comprised in the safety belt is automatically retracted, when the band is loose. Such safety belts are normally provided with means for locking the winding spindle so that the band cannot be extracted, if the vehicle is suddenly braked or turned heavily. Normally, the device is such that the band cannot be extracted rapidly even if the motor-car is at rest or is moving relatively smoothly or slowly. Such a locking of the band, which is not dependent of the motion of the vehicle, may at times be felt uncomfortable for the person who has fitted the safety belt, since the freedom of movement of said person is strictly limited. It is therefore desirable that the safety belt should be designed in such a manner that a locking of the winding spindle can only be caused by the movement of the vehicle, e.g., at a heavy braking or a collision. It is also desirable that the locking shall not occur, until the change of direction or velocity of the vehicle has surpassed a certain value and that the locking will then occur immediately. It may, e.g., be desirable that the locking device is not actuated at an acceleration of up to 0.4 g but is locked at an acceleration of 0.5 g. These values correspond to an angle of inclination of the vehicle of about 23° and 30°, respectively. It may in some cases be advantageous to make the device unsensitive to an inclination of the vehicle of 0° to 15° and immediate actuation at attaining the upper limit. Certain prior safety belts with winding spindles have been provided with locking wheels mounted on the spindle and movable in the axial direction, which by means of screw threads or in another manner have been moved from a released position to a locking position at a rapid extraction of the band of the safety belt and a consequent rotation between the spindle shaft and the locking wheel. However, these types have sometimes also been provided with inertia actuated pendulums, which, responsive to the movement of the vehicle, have caused a braking of the locking wheel and thereby a locking of the winding spindle at an extraction of the band of the safety belt, independently of whether this occurs rapidly or not. However, this locking has then been put into function successively by the pendulum being gradually moved from its released position to its engagement position or locking position. Such devices can, therefore, due to manufacturing tolerances only with large difficulties be caused to operate at a certain limit for the change of direction or velocity of the vehicle and such devices, therefore, have a tendency to lock the winding spindle even when the vehicle is parked on a sloping or uneven ground, which is a great disadvantage, since it will then be impossible to fit the safety belt before the starting of the vehicle.

The object of the present invention is to eliminate the above disadvantages and to provide a locking device for the winding spindle, which meets the ends mentioned above.

This object is attained by providing the locking device of the present invention with a tiltable member, which has two stable positions, said tiltable member when in its one position, the released position, not actuating the movement of the winding spindle and when in its second position, the locking position, causing a locking of the winding spindle, said tiltable member being arranged so that it enters the position corresponding to the locking of the winding spindle only responsive to a change of direction or velocity of the vehicle beyond a certain limit, below which no actuation of the tiltable member occurs, and is returned to its released position, when the force is terminated which has moved the member into its locking position.

The invention will now be described more closely below with reference to the accompanying drawings.

On the drawings corresponding parts have been given the same reference numerals but a greater modifications with the addition of a letter.

Figure 1:
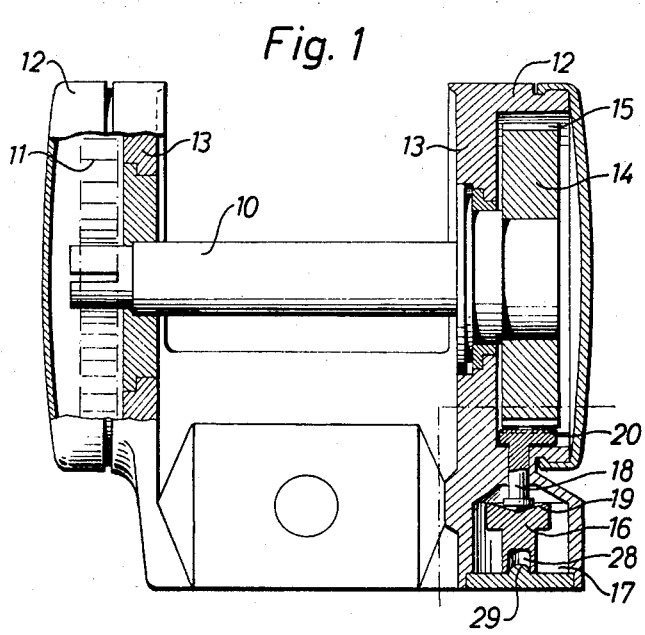
FIG. 1 shows a winding spindle of one type with one embodiment of the locking device according to the invention.
Figure 2:
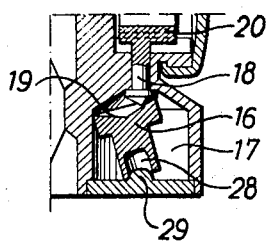
FIG. 2 shows the locking device proper in an active position.

The winding spindle according to FIG. 1 comprises a shaft 10, which at one end is provided with a coil spring 11, rotably supported in a cover 12 and adapted to rotate the shaft 10 of the winding spindle in such a direction that a band secured to the shaft is wound onto the shaft. The spindle shaft is rotably supported in two walls 13 of the cover 12 and at its other end is provided with a wheel 14 for the locking of the spindle shaft, said wheel at its periphery being provided with teeth or cogs 15. Said wheel 14 is adapted to be locked in a certain position by means of a locking device according to the present invention which is illustrated in connection with the locking wheel 14 in FIG. 1. Said locking device is comprised of a tilting member 16, which is located in a cavity 17 in the cover 12. The tilting member 16 is formed so that it abuts by means of a base surface on a support surface in the cavity 17 and does not move from this position, until the vehicle in which the safety belt is mounted changes direction or velocity beyond a certain defined limit. When this limit is surpassed, the tilting member 16 immediately moves to the position as indicated in FIG. 2. In this position the tilting member actuates a movable pin 18, which is thereby pressed upwards towards the wheel 14. This pin is supported at its lower end in a bowl-shaped recess 19 in the upper surface of the tilting member and at its upper end directed towards the wheel 14 it is provided with cogs or teeth 20, which are adapted to mesh with the cogs or teeth 15 provided on the periphery of the wheel 14 for the locking of the wheel in a certain position. The tilting motion of the tilting member is limited by the walls of the cavity 17 surrounding the tilting member in such a manner that the tilting member returns to its initial position (shown in FIG. 1), when the force ceases which moved the tilting member to the locking position.

In the embodiment illustrated in FIG. 1 the locking wheel 14 is arranged unmovable in relation to the spindle shaft 10.

Figure 3:
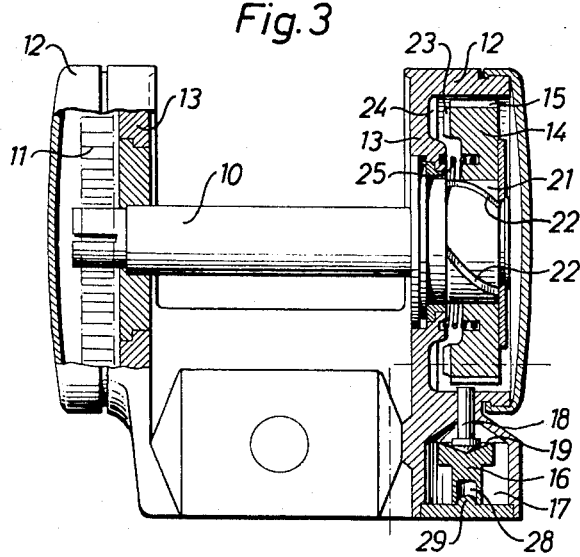
FIG. 3 shows a winding spindle of another type with a modified embodiment of the locking device of the invention.
Figure 4:
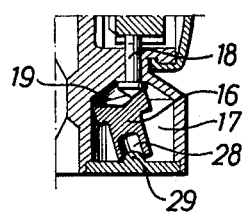
FIG. 4 shows the locking device proper of FIG. 3 in an active position.

The embodiment illustrated in FIG. 3 corresponds to the winding spindle shown in FIG. 1, with the exception that the locking wheel 14 is arranged movably in the direction of the spindle shaft 10 and guided by means of helical grooves 22 provided on an enlarged portion 21 of the shaft 10. The locking wheel 14 its one end is provided with teeth 23 which mesh with corresponding teeth 24 in the cover, if the wheel is moved to its lefthand position (in FIG. 3). Normally the wheel is maintained in its right-hand position as seen in FIG. 3 by means of a coil spring 25. The wheel 14 follows the spindle shaft 10 in its rotation and will not mesh with the teeth 24 in the cover 12 in normal cases. However, if the vehicle is forcefully braked or swings, e.g., in connection with a collision, the tiltable member 16 tilts into its locking position, which is shown in FIG. 4, the pin 18 being pushed upwards and engaging teeth or a friction surface 15 on the periphery of the locking wheel. The wheel is then prevented from rotating with the shaft 10 and the wheel will due to the helical guide grooves 22 be prevented from being moved on the shaft in a direction towards the left-hand side of the cover (as shown on the drawing) so that the cogs 23 and 24 will mesh with each other and an effective locking of the locking wheel will be achieved. Since the teeth 23 and 24 on the locking wheel 14 and the cover 12 respectively, are designed to take up the great forces, the movable pin 18 need not be of so large dimensions as in the embodiment according to FIGS. 1 and 2, wherein the movable pin must take up all forces at the locking.

Figure 5:
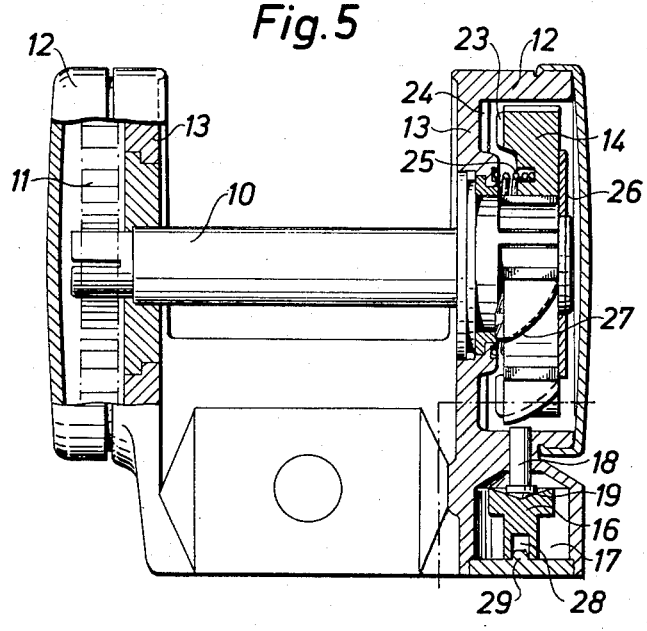
FIG. 5 shows the invention applied at a winding spindle of a further type.
Figure 6:
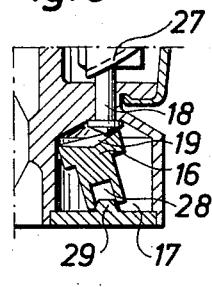
FIG. 6 shows the locking device of FIG. 5. in an active position.

The embodiment shown in FIG. 5 corresponds to the embodiment of FIG. 3, with the exception that the locking wheel 14 is movable on straight splines 26 and that the periphery of the wheel 14 is provided with helical guide cogs 27. When the tilting member, as shown in FIG. 6, has arrived in its locking position, the pin 18 has been moved upwards to engagement with the helical cogs 27 on the periphery of the wheel 14. By said engagement the wheel is moved axially to its left-hand position in said Figure, wherein the teeth 23 of the wheel mesh with the teeth 24 on the cover. Also in this case the movable pin may be of relatively small dimensions, since it needs only brake the movement of the wheel 14 sufficiently to cause the wheel to be moved on the spindle shaft.

Figure 7:
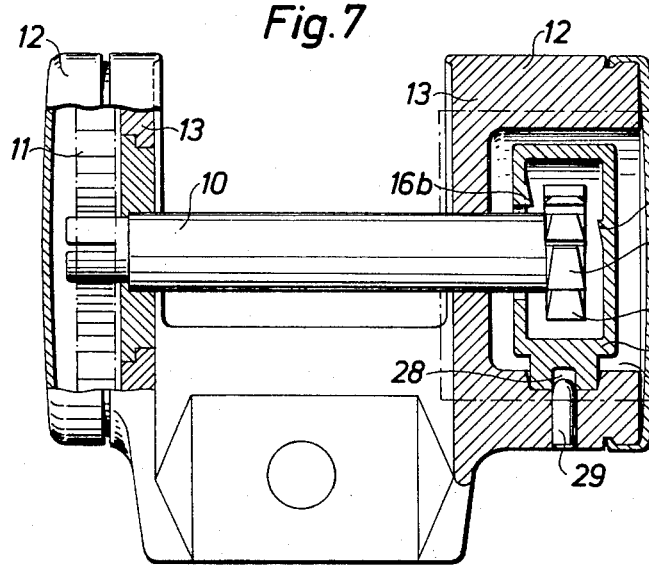
FIG. 7 shows a winding spindle of a further type with still another embodiment of the locking device of the invention.
Figure 8:
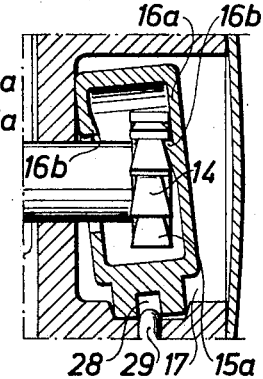
FIG. 8 shows the locking device of FIG. 7 in an active position.

In the embodiment according to FIG. 7 the tiltable member is formed as a housing 16a, which surronds a locking wheel 14 provided with cogs 15a, which, like in the previous embodiment according to FIG. 1, is rigidly fixed on the spindle shaft. This tiltable member 16a can be moved from its initial position so as to cause the locking of the spindle. The tiltable member is provided with teeth 16b on its inner side, which are adapted to mesh with the cogs 15a on the locking wheel, as shown in FIG. 8. In this embodiment no separate movable pin is thus required, since the tiltable member proper engages the locking wheel on the shaft of the spindle. The inner walls of the tiltable member must be provided with teeth arranged in such a manner that the locking wheel is locked independant of the direction in which the tiltable member tilts.

In all the embodiments illustrated the tiltable member 16 is provided with a base surface, which may be of an arbitrary shape, e.g., square or round. The form depends on whether it is desirable that the tiltable member should be tiltable with the same ease in all directions or whether the member is to be tiltable more easily in one direction or certain directions. Further, the upper portion of the tiltable member is provided with a greater mass so that the center of gravity will be located highly. This is of course not necessary but advantageous since hereby it is possible to provide the tiltable member with the desirable sensibility. The shape of the tiltable member, the location of its center of gravity and the dimensions of the base surface are the parameters, by means of which it is possible to operate so as to attain the desirable limits for transferring the tiltable member to the locking position. Also the shape of the support surface in the cavity 17, on which the base surface of the tiltable member rests, is of importance in this connection and said surface need not by necessity be plane.

In all the embodiments the tiltable member is provided with a recess 28 in the base surface, in which recess a guide pin 29 engages for guiding the tiltable member back to the released position. The tiltable member is formed so that it always returns to the released position, when the vehicle has returned to a normal condition, i.e., when the forces which have moved the tiltable member to the locking position have been terminated. It is certainly also possible to stop the tiltable member in its locking position by letting the movable pin operate as a stop.

I claim:

1. A safety belt locking mechanism for vehicles of the type in which a safety belt band is automatically wound onto a reel when not in use, which is characterized by:
   a. a rotatable shaft,
   b. a locking wheel located on said rotatable shaft,
   c. a locking member mounted adjacent said locking wheel so that one end of said locking member can move into and out of engagement with said locking wheel,
   d. a tiltable member located in supporting relationship to the lower end of said locking member,
   e. said tiltable member having a top surface and a base surface,
   f. said tiltable member having a first stable position and a second stable position, said tiltable member in said first position having its said base surface resting upon a supporting surface and in said second position resting against a stop member,
   g. said tiltable member being movable from its first position to its second position only responsive to force, caused by a change of direction or velocity of the vehicle, beyond a certain limit and being returned to its first position when said force ceases,
   h. the lower end of said locking member resting on the top surface of said tiltable member and the upper end of said locking member being out of engagement with said locking wheel when said tiltable member is in its first position and engaging with said locking wheel so as to prevent rotation of said shaft when said tiltable member is in its second position.

2. A locking mechanism of claim 1, in which the top surface of the tiltable member has a bowl-shaped recess and the lower end of said locking member rests in said recess.

3. A locking mechanism of claim 1, in which said top surface of the tiltable member is larger than said base surface.

4. A locking mechanism of claim 1, in which the locking member at its upper portion is provided with teeth meshing with teeth provided on the periphery of said locking wheel for the locking of said wheel.

* * * * *